US006981033B2

(12) United States Patent
Simpson

(10) Patent No.: US 6,981,033 B2
(45) Date of Patent: Dec. 27, 2005

(54) SELECTION OF A CANDIDATE PERIPHERAL DEVICE

(75) Inventor: Shell S. Simpson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 984 days.

(21) Appl. No.: 09/730,074

(22) Filed: Dec. 4, 2000

(65) Prior Publication Data

US 2002/0069269 A1 Jun. 6, 2002

(51) Int. Cl.[7] .................................... G06F 15/16
(52) U.S. Cl. .................................... 709/220; 709/250
(58) Field of Search .................................... 709/203, 204, 709/201, 208, 250, 220–222

(56) References Cited

U.S. PATENT DOCUMENTS

| | | | | |
|---|---|---|---|---|
| 4,608,663 | A * | 8/1986 | Gordon | 710/46 |
| 5,687,320 | A * | 11/1997 | Wiley et al. | 710/17 |
| 5,724,347 | A * | 3/1998 | Bell et al. | 370/377 |
| 5,745,754 | A * | 4/1998 | Lagarde et al. | 707/104.1 |
| 5,768,516 | A * | 6/1998 | Sugishima | 709/223 |
| 5,812,865 | A * | 9/1998 | Theimer et al. | 709/229 |
| 5,982,753 | A * | 11/1999 | Pendleton et al. | 709/223 |
| 5,991,846 | A * | 11/1999 | Ooki | 710/241 |
| 6,003,065 | A * | 12/1999 | Yan et al. | 709/201 |
| 6,018,769 | A * | 1/2000 | Tezuka et al. | 709/220 |
| 6,073,188 | A * | 6/2000 | Fleming | 710/38 |
| 6,348,971 | B2 * | 2/2002 | Owa et al. | 358/1.15 |
| 6,552,813 | B2 * | 4/2003 | Yacoub | 358/1.15 |
| 6,557,033 | B2 * | 4/2003 | Maeda | 709/223 |
| 6,584,096 | B1 * | 6/2003 | Allan | 370/352 |
| 6,643,650 | B1 * | 11/2003 | Slaughter et al. | 709/203 |
| 6,728,632 | B2 * | 4/2004 | Medl | 701/220 |

(Continued)

OTHER PUBLICATIONS

Christensson, B., et al.; WinHEC 99 White Paper, "Universal Plug and Play Connects Smart Devices", Windows Hardware Engineering Conference, Apr. 1999.*

(Continued)

*Primary Examiner*—Marc D. Thompson

(57) ABSTRACT

A method and apparatus select a peripheral for use with a computer. The method comprises the following steps: identifying a network switch to which the computer is connected; determining all peripherals connected to the network switch; and choosing one of the determined peripherals according to a predetermined criteria. According to the predetermined criteria, if the number of predetermined peripherals is one, then the predetermined peripheral is chosen; if the number of predetermined peripherals is more than a predetermined number, then none of the predetermined peripherals is chosen; if the number of predetermined peripherals is less than a predetermined number, then one of the predetermined peripherals is chosen. Optionally, the method also reads a connection table in the network switch. The apparatus comprises a network switch identification module, a peripheral determination agent and a peripheral selection logic. The peripheral determination agent is connected to the network switch identification module. The peripheral selection logic is connected to the peripheral determination agent. Optionally, the apparatus also comprises a switch connection table reader, connected to the peripheral determination agent and/or a secondary criteria agent, connected to the peripheral selection logic. In some embodiments, the apparatus also includes a main control module, connected to the a network switch identification module, the peripheral determination agent, and the peripheral selection logic. In other embodiments, the apparatus is a host computer including a network interface, connected to the network switch identification module and the peripheral determination agent. In yet other embodiments, the apparatus is a computer network, including a network switch and a printer, connected to the network switch.

21 Claims, 4 Drawing Sheets

U.S. PATENT DOCUMENTS

| | | | | |
|---|---|---|---|---|
| 6,762,852 | B1 * | 7/2004 | Fischer | 710/113 |
| 6,779,004 | B1 * | 8/2004 | Zintel | 710/10 |

OTHER PUBLICATIONS

Unknown author, "Universal Plug and Play: Background", UPnP forum, retrieved from Internet archives wayback machine, published Feb. 2, 2000.*

Unknown author, "UPnP Device Architecture, version 1.0", retrieved from Internet archives wayback machine, dated/published Jun. 8, 2000.*

Unknown author, Microsoft White Paper: "Windows Millennium Edition (ME): Understanding Universal Plug and Play", dated Jun. 2000.*

* cited by examiner

SELECTION OF A CANDIDATE PERIPHERAL DEVICE

FIELD OF THE INVENTION

This invention relates generally to computer network topology determination, and more particularly to locating a device for configuration on a computer network.

BACKGROUND OF THE INVENTION

In order to use a peripheral device with a computer, it is often necessary to configure the computer to be able to communicate with and control the peripheral. For example, in order to use a printer, it is necessary to configure the computer to send print jobs to a printer. Configuring a computer to use a peripheral device may prove to be a difficult task at times. Ideally, users should be able to simply plug their peripheral into a power outlet, connect the peripheral to the computer, and then begin using the peripheral without any additional effort.

However, the way in which a peripheral is connected to a computer greatly influences the amount of effort required to configure the computer to use the peripheral. If the computer and printer, for example, are connected through a direct connection (e.g., a parallel or serial connection), then automatic configuration can occur with some operating systems. Software that resides in the operating system periodically checks for the presence of directly connected peripherals. If any peripherals are found for which the computer is not configured to use, the identity of the peripheral is determined using conventional means (e.g., PML (peripheral management language)) and the necessary configuration takes place to enable the computer to use the peripheral. This typically involves installing software or other user intervention. Because the peripheral is directly connected to the computer, an assumption is made that the computer should be configured to be able to use it.

Unfortunately, the method described above does not work well when applied to networked peripherals. A network may have many peripherals, only a portion of which are of interest to a given computer. Users would be dissatisfied if their computer were configured to use every available network peripheral; for example, users want their computer configured only for those printers to which they are likely to print. Providing access to all printers may overburden their computer with unnecessary printing software and would make selecting a printer more difficult since there would be a potentially unbounded number of printers from which to choose. For example, it would generally not be appropriate to setup a computer system to use a printer that is on a different floor or in a different building. In short, the assumption that is applied to direct connected peripherals does not necessarily apply to network connected peripherals; just because a network peripheral is available to a computer does not mean that the computer should be configured to be able to use it.

It is still necessary, however, to configure a networked computer to be able to use a subset of network peripherals that are relevant to the user. Today, printers are typically identified using two methods. According to a first method, the user is provided with a list of network peripherals discovered using conventional means. This list contains identifying information such as a model name of the peripheral and a network address. The user takes advantage of this information to select the peripheral for which they wish to configure their computer. For example, a user will often print a self-test page to determine the hardware network address (e.g., Ethernet address) of a printer in order to make an accurate selection. According to a second method, the user enters the network address of the peripheral directly into software, without consulting the list of discovered peripherals.

Both of these methods often require the user to select the desired printer by its network address. In the first method, the user may be able to determine the desired printer simply from the model name; however, when more than one particular model of a printer exists on the network, it may be difficult to choose which printer of a particular model to configure. Although common practice today, it is an unacceptable burden to require users to know details of a computer network, such as the network address of the printer. Furthermore, users should not have to print a self-test page to obtain the information necessary to configure their computer to use a printer.

SUMMARY OF THE INVENTION

In one respect, the invention is a method for selecting a peripheral for use with a computer. The method comprises the following steps: identifying a network switch to which the computer is connected; determining all peripherals connected to the network switch; and choosing one of the determined peripherals according to a predetermined criteria. According to the predetermined criteria, if the number of predetermined peripherals is one, then the predetermined peripheral is chosen; if the number of predetermined peripherals is more than a predetermined number, then none of the predetermined peripherals is chosen; if the number of predetermined peripherals is less than a predetermined number, then one of the predetermined peripherals is chosen. Optionally, the method also reads a connection table in the network switch.

In another respect, the invention is a computer readable medium on which is embedded a program that performs the above method.

In yet another respect, the invention is an apparatus. The apparatus comprises a network switch identification module, a peripheral determination agent and a peripheral selection logic. The peripheral determination agent is connected to the network switch identification module. The peripheral selection logic is connected to the peripheral determination agent. Optionally, the apparatus also comprises a switch connection table reader, connected to the peripheral determination agent and/or a secondary criteria agent, connected to the peripheral selection logic. In some embodiments, the apparatus also includes a main control module, connected to the network switch identification module, the peripheral determination agent, and the peripheral selection logic. In other embodiments, the apparatus is a host computer including a network interface, connected to the network switch identification module and the peripheral determination agent. In yet other embodiments, the apparatus is a computer network, including a network switch and a printer, connected to the network switch.

In comparison to known prior art, certain embodiments of the invention are capable of achieving certain advantages, including some or all of the following: (1) automatic configuration of a peripheral without user knowledge of the peripheral's address; (2) synergy between network switches and printers; (3) compatibility with standards compliant network switches; (4) eliminating any need for the user to understand network details; and (5) decreased user frustration and support calls to computer and peripheral manufacturers during the configuration process. Those skilled in the art will appreciate these and other advantages and benefits of various embodiments of the invention upon reading the following detailed description of a preferred embodiment with reference to the below-listed drawings.

DETAILED DESCRIPTION OF A PREFERRED EMBODIMENT

Figure 1:
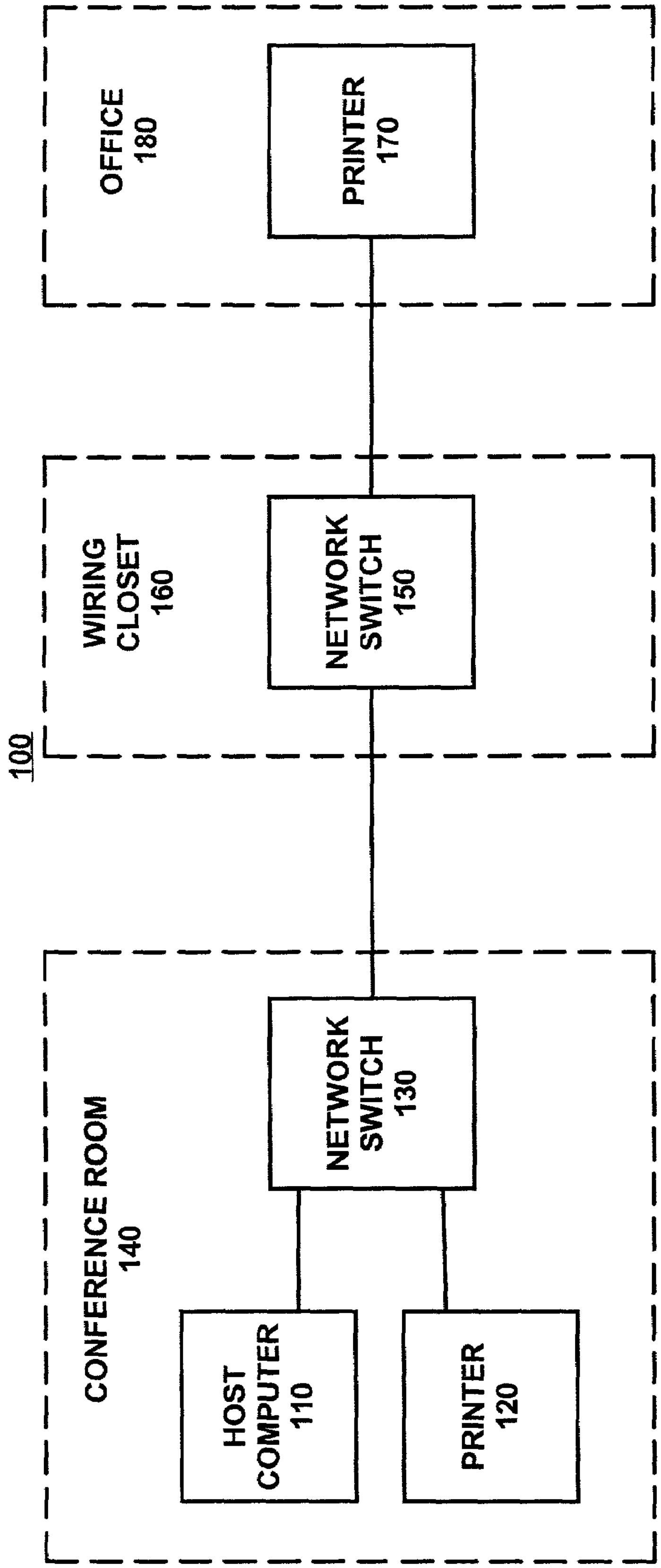
FIG. 1 is a network layout diagram.

FIG. 1 is a diagram of the layout of a network 100. In the network 100, a host computer 110, a printer 120, and a network switch 130 are located near each other in a conference room 140. The network switch 130 is connected to the rest of the network 100 through a network switch 150, which is remotely located in a wiring closet 160. A printer 170 is located in an office 180 and is connected to the network switch 150. The printer 170 in the office 180 is not near the host computer 110 in the conference room 140. As network switches commonly do, the network switch 130 enables several devices to share the same connection to the primary network. Since there are two devices in the conference room 140, the network switch 130 can be used to provide both devices with a connection to the network 100. The network switch 130 can also be used to connect local traffic. When a packet from a device connected to the network switch 130 is sent to a device connected to that same network switch 130, the packet will be routed directly. That packet will not be transmitted to the network switch 150, because the network switch 130 can handle the delivery locally. Because the network switch 130 is intended to handle the networking needs within the conference room 140 exclusively, it probably provides a limited number of connection points (i.e. four to eight). A user of the host computer 110 likely may desire to make use of the printer 120 also located in the conference room 140—as opposed to making use of the printer 170 located in some remote office 180. According to an embodiment of the invention, the host computer 110 can discover that the printer 120 is connected to the same network switch 130 and that the network switch 130 provides a relatively small number of connection points. From these two facts, the host computer 110 can infer that the printer 120 is closer and thus more preferable than the printer 170.

In one embodiment, the host computer 110 is a portable (e.g., laptop, notebook or palm-held) computer. The connection between the portable host computer 110 and the network switch 130 may be wired or wireless. As the portable host computer 110 enters the conference room 140, a connection to the network switch 130 is established. The portable host computer 110 discovers that the printer 120 is connected to the same switch 130 and accordingly configures itself for use with the printer 120. Thereafter, when the user of the portable host computer 110 clicks on the printer icon within an application program or otherwise wishes to print, the printout is automatically sent to the nearby printer 120.

In this example, the peripherals 120 and 170 are printers, but this need not be the case. The printer 120 and the printer 170 can be any peripheral device generally.

Figure 2:
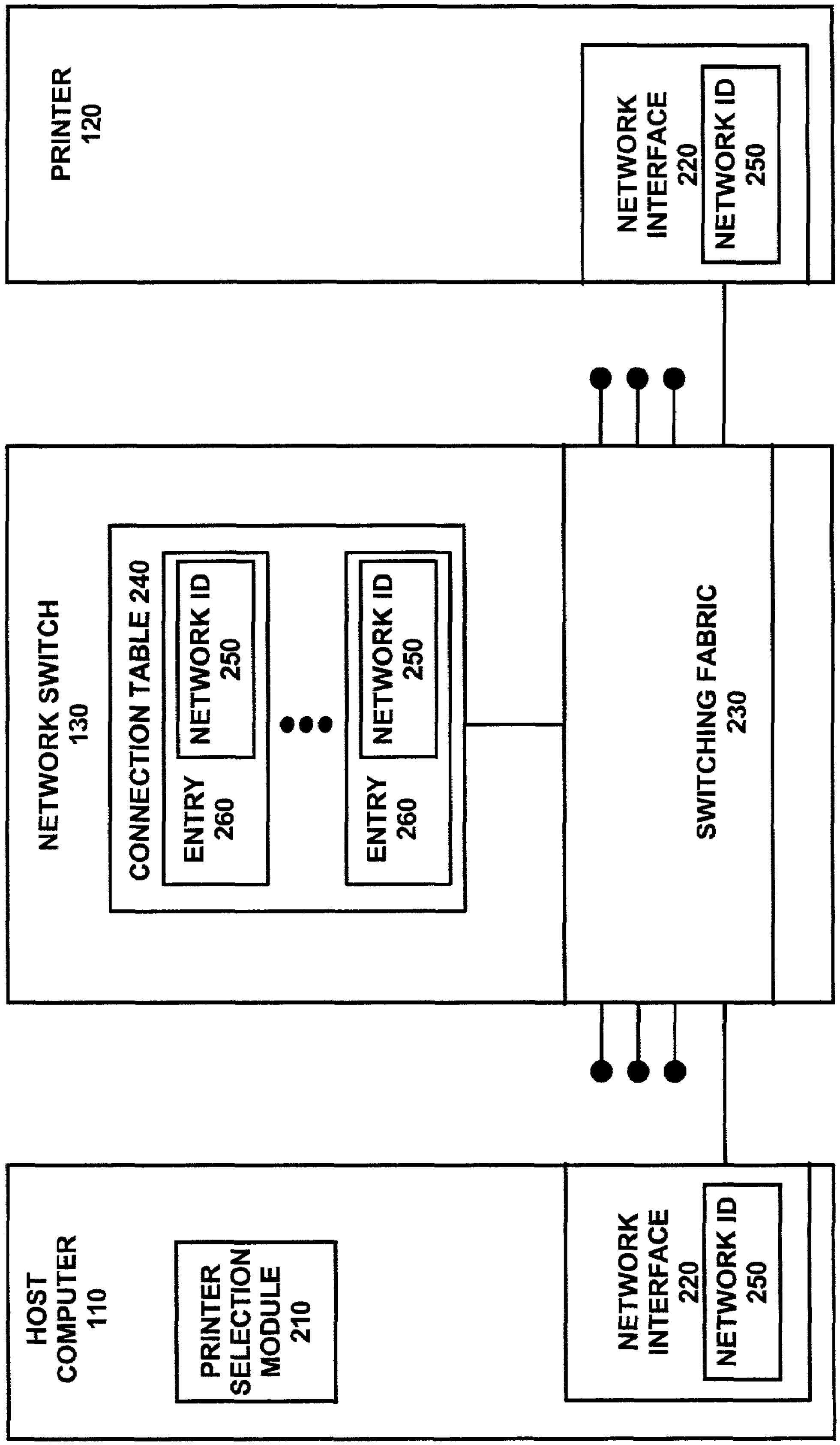
FIG. 2 is a block diagram of a network switch and its connections.

FIG. 2 is a more detailed block diagram of the host computer 110, the printer 120 and the network switch 130. The host computer 110 contains a printer selection module 210 that enables the user to select the printer that he wishes to configure his computer to be able to use. The printer selection module 210 is described in greater detail below. The host computer 110 and the printer 120 are connected to the network switch 130 using network interfaces (e.g., Ethernet interfaces) 220. The network switch 130 contains a switching fabric 230 and a connection table 240. The switching fabric 230 has eight connection points or ports. Unconnected ports are illustrated with terminating circles. Each of the network interfaces 220 connect to a port on the switching fabric 230. The switching fabric 230 is responsible for receiving incoming network communications from connected network interfaces 220 and routing them appropriately. The connection table 240 stores a list of the network interfaces 220 which are connected to the network switch 130. The network interfaces 220 are identified by a unique network identifier (network ID) 250. These unique network IDs 250 are stored as entries 260 of the connection table 240. The switchingfabric 230 uses the information stored in the connection table 220 to perform routing.

Figure 3:
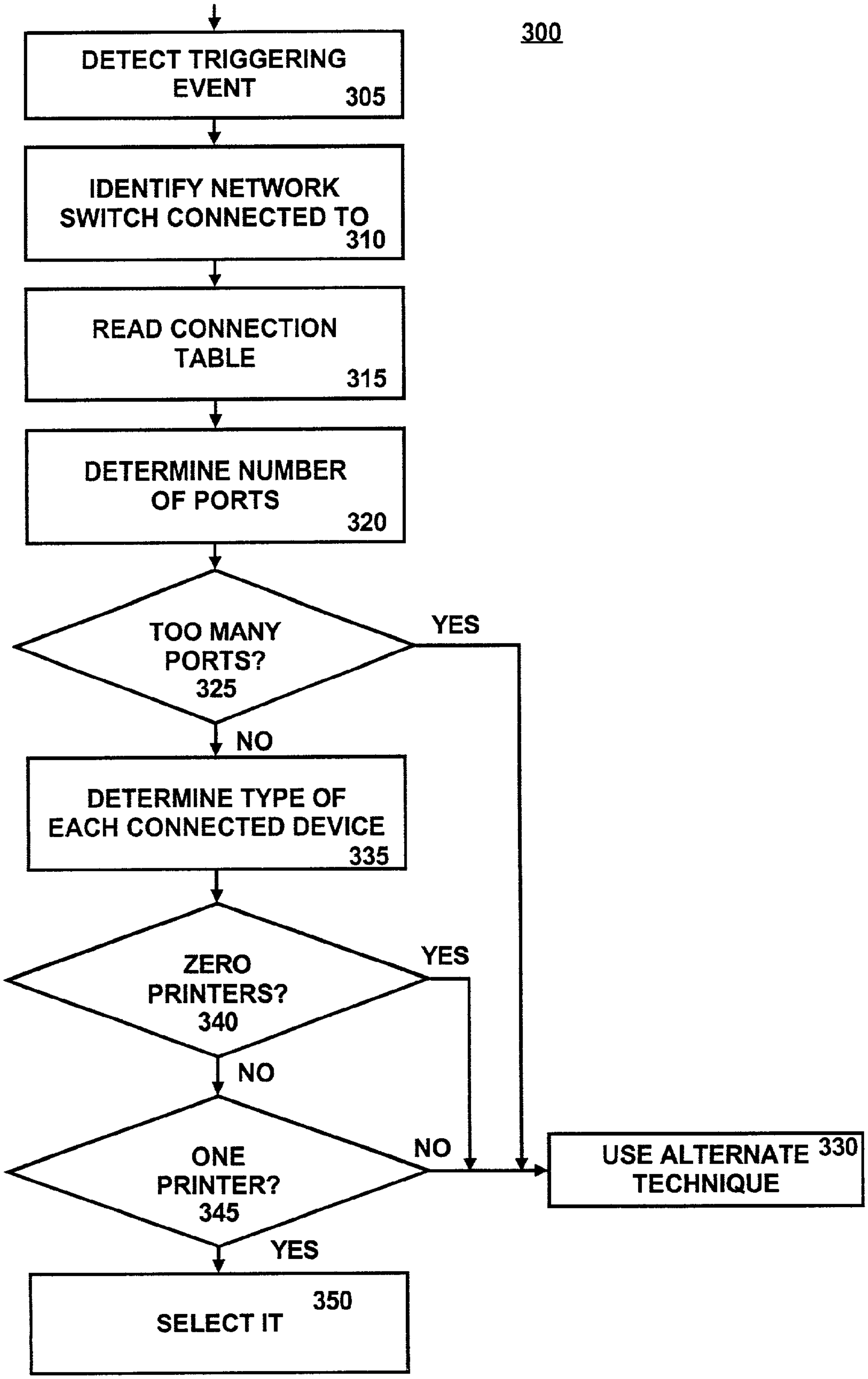
FIG. 3 is a flowchart of a method according to an embodiment of the invention.

The printer selection module 210 is used to select a printer, according to the method 300, a flowchart of which is illustrated in FIG. 3. The method 300 begins when a triggering event is detected (305). A triggering event may be a change in network connection status for the host computer 110. For example, the host computer's (110) connecting to a new network switch 130 can be a triggering event. Another possible triggering event is explicit activation by the user. After a triggering event is detected (305), the method 300 identifies (310) the network switch to which it is connected. The identification step 310 can be accomplished using known network discovery protocols. Such protocols are typically used in most network management software. For example, SNMP (simple network management protocol) provides a mechanism by which devices possessing an SNMP agent can be discovered. After all switches connected to the network have been identified, the specific switch to which the host computer 110 is most proximately connected can be identified by examining the connection table of each switch. The switch possessing an entry in its connection table that contains the network identifier of the host computer 110 is the switch to which the host computer is connected. A protocol for obtaining connection information from a network switch has been standardized. This protocol is described in Internet Engineering Task Force's (IETF) Request for Comments (RFC) 1493, entitled "Definition of Managed Objects for Bridges."

After identifying (310) the connected network switch, the method 300 reads (315) the switch's connection table and determines (320) the number of ports. There is one connection table entry for each port. The method 300 then tests (325) whether the number of ports is too large. In one embodiment, the threshold is eight: if there are more than eight ports, then the method 300 essentially aborts and an alternate technique is used (330) instead. One example of an alternate technique is described in commonly assigned U.S. patent application Ser. No. 09/494,106, now U.S. Pat. No. 6,611,880, entitled "System for Selecting a Device over a Network for a Computer to Use," filed Jan. 1, 2000, which is hereby incorporated by reference. According to the technique disclosed in therein, the amount of time a printer has been turned on is used as a basis for identifying the printer a user probably want to configure her computer to be able to use. That technique exploits the fact that the printer most recently turned on is the printer a user wants to configure her computer to be able to use, because the printer has just been purchased and unpacked or because the printer has been moved from another location.

If, on the other hand, there are not too many ports on the identified network switch, then the method 300 determines (335) the type of device, if any, connected to the switch. The type determination step 335 can be accomplished by querying the devices whose network IDs are found in the switch's connection table. Most network devices contain SNMP agents that can be queried so as to determine the type of device. The method 300 then tests (340, 345) the number of printers so found. If no printers are found, then the method 300 essentially aborts and uses (330) an alternate technique to select a printer. If multiple printers are found, then the method 300 uses (330) an alternate technique to select from among those multiple printers. If exactly one printer is found, then that printer is selected (350) as the printer to configure for use.

One skilled in the art will appreciate that the method 300 can be varied in many ways. A sampling of these variations are next described. First, the testing step 325, by which the number of ports on the switch is compared to some predetermined threshold, can be eliminated or altered. According to one alteration, only the total active or connected ports are tested. Second, the alternate technique employed after the zero printer testing step 340 can be a repeating of the same basic method 300 in successive layers for each network switch connected to the identified network switch. That is, if no printer is connected to the immediate network switch (i.e., one hop away), look for a printer two hops away. (In FIG. 1, the printer 170 is two hops away from the host computer 110.) As a third variation, the steps of the method 300 can be performed in an order different from that illustrated. Fourth, the method 300 can be applied to select any type of peripheral device, not just a printer. A printer is merely an illustrative peripheral device.

Figure 4:
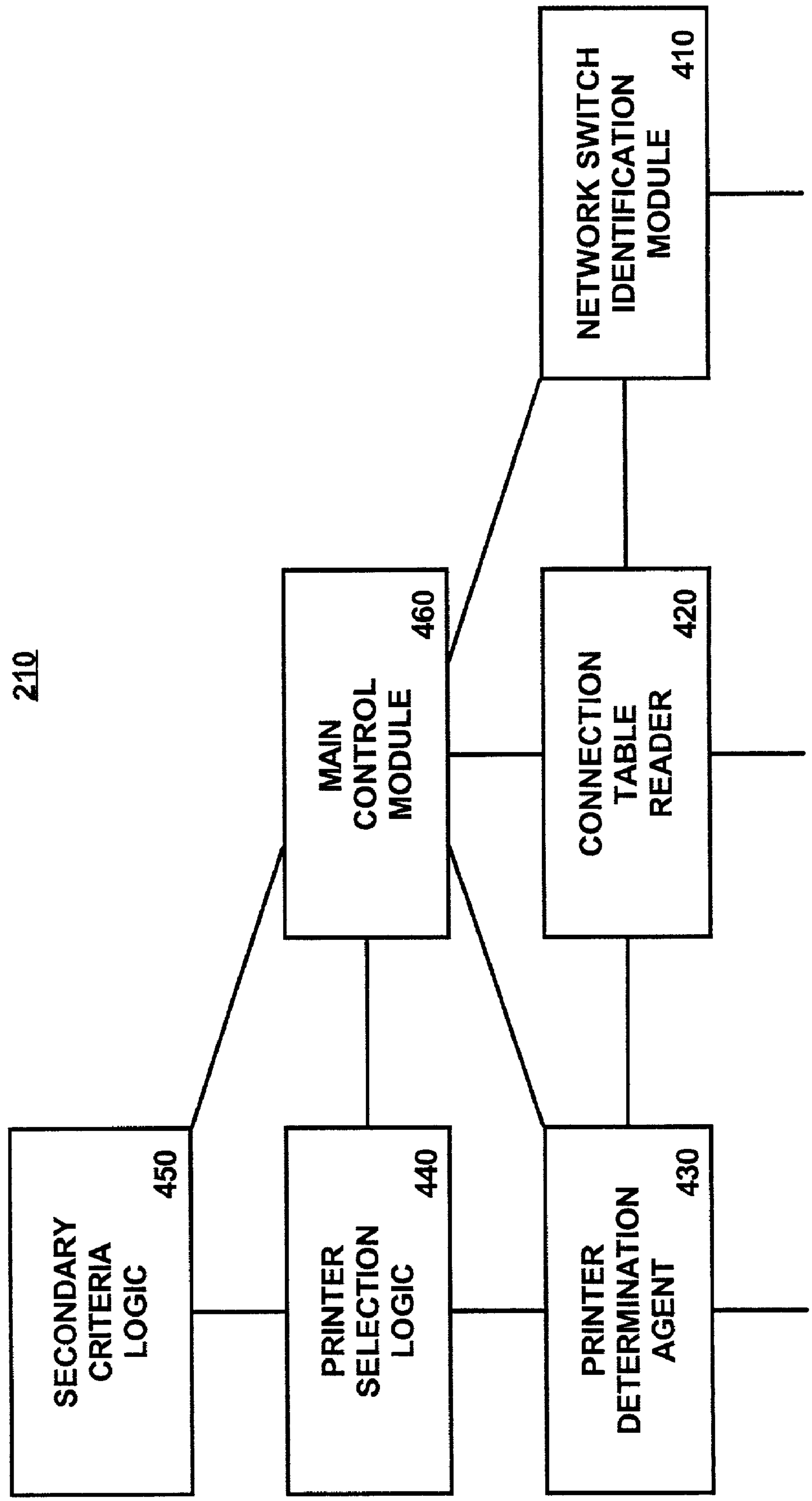
FIG. 4 is a block diagram of component modules according to an embodiment of the invention.

FIG. 4 is a block diagram of components of the printer selection module 210, according to one embodiment of the invention. The printer selection module 210 comprises a network switch identification module 410, a connection table reader 420 and a printer determination agent 430—each of which communicates (preferably using the SNMP or a similar protocol) through the network interface 220 in the host computer 110. The network switch identification module 410 implements the switch identification step 310 in the method 300. The connection table reader 420 implements the table reading step 315. The printer determination agent 430 implements the device type determination step 335. The printer selection logic 440 performs the steps 320, 325 and 340–350 of the method 300. The secondary criteria logic 450 implements the alternate technique of step 330. The main control module controls and coordinates the operation of the other components 410–450.

The printer selection module 210 is preferably a software program, and the components 410–450 are preferably subprograms called by the main control module 460, which is a main program. Alternatively, the printer selection logic 440 can be integrated into the main control module 460. Other integration and rearrangements of functionality are possible, as one skilled in the art would appreciate. Although software is preferred, some or all of the components 410–460 could be hardware or firmware modules. As software modules, the components 410–460 can exist in a variety of forms both active and inactive, including source code, object code, executable code or other formats. As hardware, the modules 410–460 can take the form of hardware description language (HDL) files. Any of the above can be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), and magnetic or optical disks or tapes. Exemplary computer ridable signals, whether modulated using a carrier or not, are signals that a computer system can be configured to access, including signals downloaded through the Internet or other networks. In a sense, the Internet itself, as an abstract entity, is a computer readable medium. The same is true of computer networks in general.

All considered, the method 300 and/or the printer selection module 210 is a valuable way of helping a user to select a desired printer, even though a successful selection cannot be guaranteed. Not all network environments make use of network switches (although this is likely to become more and more prevalent). In many network environments, networking switches are only used in the wiring closets—not in offices and conference rooms. Connection to the same network switch is used to speculate on how close devices connected to the switch are located, and closeness is used to speculate on how likely a printer is to be the printer desired. Both of these speculations may prove wrong. A switch providing a small number of connection points may be used to connect devices that are far away from each other. This is unlikely, but still possible. A user may want to configure their computer system to be able to print to a printer that is far away rather than a printer that is near. Once again, this is unlikely, but is still possible. Despite these imperfections, the method 300 and the printer selection module 210 in most cases are extremely valuable to a user What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A method for selecting a peripheral for use with a computer, comprising:

connecting the computer to a particular network switch of a plurality of coupled network switches, the particular network switch thus defined as a local network switch;

reading a connection table in at least one of the plurality of network switches, each connection table including one or more network identifiers respectively corresponding to one or more peripherals;

querying one or more of the peripherals using the network identifiers to ascertain a respective type for each queried peripheral; and configuring a cooperative association between the computer and one of the ascertained peripherals in accordance with a predetermined criteria.

2. The method of claim 1, wherein the predetermined criteria comprises not configuring the cooperative association if more than a predetermined number of peripherals of a predetermined type are ascertained.

3. The method of claim 1, wherein the predetermined criteria comprises configuring the cooperative association if only one peripheral of a predetermined type is ascertained.

4. The method of claim 1, wherein the predetermined criteria comprises configuring the cooperative association if less than a predetermined number of peripherals of a predetermined type are ascertained.

5. The method of claim 1, wherein the reading a connection table is further defined by reading only the connection table in the local network switch.

6. The method of claim 5, wherein the predetermined criteria comprises configuring the cooperative association if only one peripheral of a predetermined type is connected to the local network switch.

7. The method of claim 1, wherein the predetermined criteria comprises configuring the cooperative association between the computer and a printer.

8. An apparatus, comprising:

a network switch identification module configured to identify a local network from a coupled plurality of network switches, wherein the local network switch is connected to the apparatus;

a connection table reader coupled to the network switch identification module, the connection table reader configured to read a connection table in one or more of the plurality of network switches;

a peripheral determination agent coupled to the connection table reader, the peripheral determination module configured to query one or more peripherals respectively connected to the plurality of network switches in response to the reading and ascertain a respective type for each queried peripheral; and a peripheral selection module coupled to the peripheral determination agent, the peripheral selection module configured to configure a cooperative association between a computer and one of the ascertained peripherals in accordance with a predetermined criteria.

9. The apparatus of claim 8, and further comprising a network interface configured to enable communications between the apparatus and the plurality of network switches.

10. The apparatus of claim 8, wherein the peripheral selection module is further configured not to configure the cooperative association if more than a predetermined number of peripherals of a predetermined type are ascertained.

11. The apparatus of claim 8, wherein the peripheral selection module is further configured to configure the cooperative association if only one peripheral of a predetermined type is ascertained.

12. The apparatus of claim 8, wherein the peripheral selection module is further configured to configure the cooperative association if only one peripheral of a predetermined type is connected to the local network switch.

13. The apparatus of claim 8, wherein the connection table reader is further configured to read only the connection table in the local network switch.

14. The apparatus of claim 8, wherein peripheral selection module is further configured to configure the cooperative association between the computer and a printer.

15. A computer readable medium including a program code, the program code configured for use with a computer connected to a local network switch of a coupled plurality of network switches, the program code configured to cause the computer to:

read a connection table in at least one of the plurality of network switches, each connection table including one or more network identifiers respectively corresponding to one or more peripherals respectively connected to the corresponding network switch;

query one or more of the peripherals using the network identifiers to ascertain a respective type for each queried peripheral; and configure a cooperative association between the computer and one of the ascertained peripherals in accordance with a predetermined criteria.

16. The computer readable medium of claim 15, wherein the program code is further configure to cause the computer not to configure the cooperative association if more than a predetermined number of peripherals of a predetermined type are ascertained.

17. The computer readable medium of claim 15, wherein the program code is further configure to cause the computer to configure the cooperative association if only one peripheral of a predetermined type is ascertained.

18. The computer readable medium of claim 15, wherein the program code is further configure to cause the computer to configure the cooperative association if less than a predetermined number of peripherals of a predetermined type are ascertained.

19. The computer readable medium of claim 15, wherein the program code is further configured to cause the computer to read only the connection table in the local network switch.

20. The method of claim 19, and wherein the predetermined criteria comprises configuring the cooperative association if only one peripheral of a predetermined type is connected to the local network switch.

21. The method of claim 15, and wherein the predetermined criteria comprises configuring the cooperative association between the computer and a printer.

* * * * *